United States Patent
Hafenecker et al.

(10) Patent No.: US 11,016,164 B2
(45) Date of Patent: May 25, 2021

(54) TRANSMIT ARRANGEMENT FOR GENERATING A SIGNAL PATTERN SUITABLE FOR LOCALIZATION AND RECEIVE ARRANGEMENT FOR EXECUTING A LOCALIZATION

(71) Applicant: Fraunhofer-Gesellschaft zur Foerderung der angewandten Forschung e.V., Munich (DE)

(72) Inventors: Sven Hafenecker, Nuremberg (DE); Nils Hadaschik, Munich (DE); Marc Fassbinder, Nuremberg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 390 days.

(21) Appl. No.: 16/064,541

(22) PCT Filed: Dec. 21, 2016

(86) PCT No.: PCT/EP2016/082174
§ 371 (c)(1),
(2) Date: Jun. 21, 2018

(87) PCT Pub. No.: WO2017/108947
PCT Pub. Date: Jun. 29, 2017

(65) Prior Publication Data
US 2019/0004138 A1    Jan. 3, 2019

(30) Foreign Application Priority Data

Dec. 21, 2015 (DE) .................. 10 2015 122 420.8

(51) Int. Cl.
*G01S 1/20* (2006.01)
*G01S 1/04* (2006.01)

(52) U.S. Cl.
CPC ............ *G01S 1/0428* (2019.08); *G01S 1/042* (2013.01); *G01S 1/20* (2013.01)

(58) Field of Classification Search
CPC .......... G01S 1/0428; G01S 1/042; G01S 1/20; G01S 3/48; G01S 3/46; G01S 3/043; G01S 3/023; G01S 5/06
(Continued)

(56) References Cited

U.S. PATENT DOCUMENTS

| | | |
|---|---|---|
| 3,701,018 A | 10/1972 | Groth, Jr. |
| 7,277,679 B1 * | 10/2007 | Barratt .................. H04B 7/084 375/347 |

(Continued)

FOREIGN PATENT DOCUMENTS

| | | |
|---|---|---|
| DE | 2023795 | 2/1971 |
| WO | 2007013071 A1 | 2/2007 |

(Continued)

OTHER PUBLICATIONS

Schmidt, R.O, "Multiple Emitter Location and Signal Parameter Estimation," IEEE Trans. Antennas Propagation, vol. AP-34 (Mar. 1986), pp. 276-280.

(Continued)

*Primary Examiner* — Harry K Liu
(74) *Attorney, Agent, or Firm* — 2SPL Patent Attorneys PartG mbB; Kieran O'Leary (57) ABSTRACT

A transmit arrangement (100) for generating a signal pattern suitable for a localization comprises a first antenna (102) and at least one second antenna (104) spatially separated from the first antenna. A transmit apparatus (106) of the transmit arrangement (100) is configured to generate a known signal form and to transmit the known signal form by means of a transmit signal via the first and second antennas (104).

19 Claims, 7 Drawing Sheets

(58) Field of Classification Search
USPC .......................................................... 342/442
See application file for complete search history.

(56) References Cited

U.S. PATENT DOCUMENTS

| | | | | |
|---|---|---|---|---|
| 7,346,316 | B1* | 3/2008 | Kubo | H04B 7/026 |
| | | | | 455/101 |
| 2006/0064244 | A1* | 3/2006 | Robbins | G01C 15/00 |
| | | | | 701/471 |
| 2008/0225931 | A1* | 9/2008 | Proctor | H04B 7/15571 |
| | | | | 375/214 |
| 2009/0324250 | A1* | 12/2009 | Chen | H04B 10/00 |
| | | | | 398/182 |
| 2011/0134901 | A1* | 6/2011 | Hoshino | H04B 7/0617 |
| | | | | 370/344 |
| 2011/0200144 | A1* | 8/2011 | Adler | H04B 7/0894 |
| | | | | 375/316 |
| 2011/0201297 | A1* | 8/2011 | Adler | H04B 7/0868 |
| | | | | 455/334 |
| 2014/0120947 | A1* | 5/2014 | Siomina | G01S 5/06 |
| | | | | 455/456.1 |
| 2016/0047885 | A1* | 2/2016 | Wang | G01S 1/042 |
| | | | | 342/442 |

FOREIGN PATENT DOCUMENTS

| | | |
|---|---|---|
| WO | 2008022622 A1 | 2/2008 |
| WO | 2011058067 A1 | 5/2011 |

OTHER PUBLICATIONS

Roy, Richard, and Thomas Kailath. "ESPRIT—estimation of signal parameters via rotational invariance techniques." Acoustics, Speech and Signal Processing. IEEE Transactions on 37.7 (1989): 984-995.

Vanderveen, Michaela C., Constantinos B. Papadias, and Arogyaswami Paulraj. "Joint angle and delay estimation (JADE) for multipath signals arriving at an antenna array." Communications Letters, IEEE 1.1 (1997): 12-14.

Van der Veen, Alle-Jan., Michaela C. Vanderveen, and A. Paulraj. "Si-JADE: an algorithm forjoint angle and delay estimation using shift-invariance properties." Signal Processing Advances in Wireless Communications, First IEEE Signal Processing Workshop on. IEEE, 1997.

Weiss, Anthony J., and Alon Amar. "Direct position determination of multiple radio signals." EURASIP Journal on Applied Signal Processing Jan. 2005 (2005): 37-49.

H. Lu et al: "Cooperative TDOA Estimation with Trigger Relay". 2011 IEEE 22nd International Symposium on Personal, Indoor and Mobile Radio Communications. 2011 IEEE 22nd International Symposium on Personal, Indoor and Mobile Radio Communications.

Ralph Schmidt et al, "Multiple Source DF Signal Processing: An Experimental System", IEEE Trans., Antennas Propagation, vol. AP-34 Mar. 8, 1986), pp. 281-290.

* cited by examiner

TRANSMIT ARRANGEMENT FOR GENERATING A SIGNAL PATTERN SUITABLE FOR LOCALIZATION AND RECEIVE ARRANGEMENT FOR EXECUTING A LOCALIZATION

TECHNICAL FIELD

Embodiments relate to a transmit arrangement for generating a signal pattern suitable for localization of an object and to a receive arrangement for executing the localization based on an observed signal pattern.

BACKGROUND

Applications in which a localization or location of an item is desirable are manifold. For example, frequently a radio location of industrial trucks or other vehicles in the logistics or production environment inside or outside a warehouse is to be executed with a lowest possible number of installed radio infrastructure nodes. Here, for example, an absolute position of the vehicle in the warehouse (i.e. in the local coordinate system) is to be determined or also the position of other objects, like e.g. stored goods or goods. Other objects may in some applications be positioned absolutely by means of a relative location with respect to the vehicle. Due to the dimension of a positioned euro pallet with a width of 60 cm frequently a location with an accuracy of 30 cm is aimed at. Half a pallet width enables a clear allocation of a pallet to the located vehicle and/or an identification of the directly located pallet.

Currently used methods of localization are on the one hand based on optical measurements and on the other hand on the evaluation of wirelessly transmitted signals of different signal characteristics. While optical systems in particular suffer from contamination and small opening angles, and/or the additional mechanical effort to be able to mechanically adjust the optics, currently available radio systems do not reach the required accuracy of localization despite sometimes massive use of infrastructure. This applies even more if a localization within buildings is desired which leads to a strong multipath propagation of radio signals. If wireless signals are used, i.e. localization or location is based on radio location, the number of infrastructure nodes ought to be low to limit the installation effort and keep radio channel utilization low and the price of the distributed infrastructure reasonable.

It is thus the object to provide a system for the localization of items which enables a sufficient localization accuracy with a reasonable infrastructure.

SUMMARY

Embodiments enable this by means of a transmit arrangement for generating a signal pattern suitable for a localization including at least a first antenna and a second antenna spatially separated from the first antenna. A transmit apparatus is configured to generate a known signal form and to transit the known signal form by means of a transmit signal via the first and second antennas.

The transmit arrangement thus generates a signal pattern in the space or volume in which the localization is to take place. This signal pattern changes depending on the place where the signal pattern is observed which may again be used for localization.

One embodiment of a receive arrangement for executing a localization based on the observed signal pattern includes a receive antenna arrangement for receiving a transmit signal transmitted by the first antenna and a transmit signal transmitted by the second antenna. The receive arrangement further includes a signal analysis device configured to identify a known signal form each in the transmit signal received from the first or second antennas and determine a time difference between the identified signal form in the transmit signal received from the first antenna and the one from the second antenna. Based on the time difference and information on the position of the first and second antennas a localization device may determine information on a position of the receive antenna arrangement and thus also on the position of an object to which the receive antenna arrangement is mounted.

A time difference between the known signal form in the received transmit signals received from the first and the second antennas depends both on the relative orientation between the first antenna and the second antenna known a priori and also on the position of the receive antenna arrangement with respect to the first antenna and the second antenna of the transmit arrangement. Knowledge of the relative position of the two antennas and the time difference in which the known signal form was found in the transmit signal received from the first and the second antenna consequently allows to determine the position of the receive antenna arrangement.

According to some embodiments, a time difference between transmitting the known signal form via the first antenna and via the second antenna is greater than an oscillation period of the transmit signal by means of which the known signal form is transmitted. This may enable to increase the robustness of the method, for example in case of a strong multipath propagation.

According to some embodiments, a time difference between transmitting the known signal form via the first antenna and via the second antenna is greater than 25% of the inverse of a bandwidth of the transmit signal. This may, for example, increase the robustness of the method. The accuracy with which the known signal form may be identified in the transmit signal received from the first or second antenna is impaired only slightly even with a massive multipath reception, which may lead to a temporal overlaying of the known signal forms at the location of the receive arrangement with a sufficiently large temporal distance.

According to some embodiments, the time difference between the transmitting of the known signal form via the first antenna and transmitting of the known signal form via the second antenna temporally varies, i.e. a first time difference between transmitting the known signal form via the first antenna and the second antenna for an initial transmission may be different from a second time difference between transmitting the known signal form via the first antenna and the second antenna in a subsequent transmission. Such a temporal variation may further be used to increase the robustness of the method or to improve the location accuracy.

According to some embodiments, the transmit arrangement is configured to modulate a carrier signal with the known signal form to acquire the transmit signal. This may reduce the costs for the transmit and receive infrastructure as already established systems may be used which modulate a baseband signal onto a carrier. Apart from that it may thus be enabled to adapt the bandwidth of the known signal form, i.e. the speed at which the known signal form changes, independent of the carrier signal, to the conditions of the installation without generating a basic new design of the hardware used for the infrastructure.

According to some embodiments of the receive arrangement, the localization device is further configured to determine information on a relative orientation of the receive antenna arrangement with respect to the first antenna and the second antenna based on a relative phase between a carrier signal transmitted by the first antenna and a carrier signal transmitted by the second antenna. For this purpose, some embodiments of receive arrangements include a group antenna for receiving transmit signals transmitted by the first and the second antennas.

BRIEF DESCRIPTION OF THE FIGURES

Embodiments are explained in more detail with reference to the accompanying Figures, in which.

DESCRIPTION

Various embodiments will now be described with reference to the accompanying drawings in which some example embodiments are illustrated. In the Figures, the thicknesses of lines, layers and/or regions may be exaggerated for clarity.

Like numbers refer to like or similar components throughout the following description of the included figures, which merely show some exemplary embodiments. Moreover, summarizing reference signs will be used for components and objects which occur several times in one embodiment or in one Figure but are described at the same time with respect to one or several features. Components and objects described with like or summarizing reference signs may be implemented alike or also differently, if applicable, with respect to one or more or all the features, e.g. their dimensioning, unless explicitly or implicitly stated otherwise in the description.

Although embodiments may be modified and changed in different ways, embodiments are illustrated as examples in the Figures and are described herein in detail. It is to be noted, however, that it is not intended to restrict embodiments to the respectively disclosed forms but that embodiments rather ought to c any functional and/or structural modifications, equivalents and alternatives which are within the scope of the invention. Same reference numerals designate same or similar elements throughout the complete description of the figures.

It is noted, that an element which is referred to a being "connected" or "coupled" to another element, may be directly connected or coupled to the other element or that intervening elements may be present. If an element is referred to as being "directly connected" or "directly coupled" to another element, no intervening elements are be present. Other terms used to describe a relationship between elements ought to be interpreted likewise (e.g. "between" versus "directly between", "adjacent" versus "directly adjacent", etc.).

The terminology used herein only serves for the description of specific embodiments and should not limit the embodiments. As used herein, the singular form such as "a," "an" and "the" also include the plural forms, as long as the context does not indicate otherwise. It will be further understood that the terms e.g. "comprises," "comprising," "includes" and/or "including," as used herein, specify the presence of the stated features, integers, steps, operations, elements and/or components, but do not preclude the presence or addition of one and/or more other features, integers, steps, operations, elements, components and/or any groups thereof.

Unless otherwise defined, all terms (including technical and scientific terms) are used herein in their ordinary meaning of the art to which the examples belong and given to same by a person of ordinary skill in the art. It is further clarified that terms like e.g. those defined ion generally used dictionaries are to be interpreted to have the meaning consistent with the meaning in the context of relevant technology, as long as it is not expressly defined otherwise herein.

Figure 1:
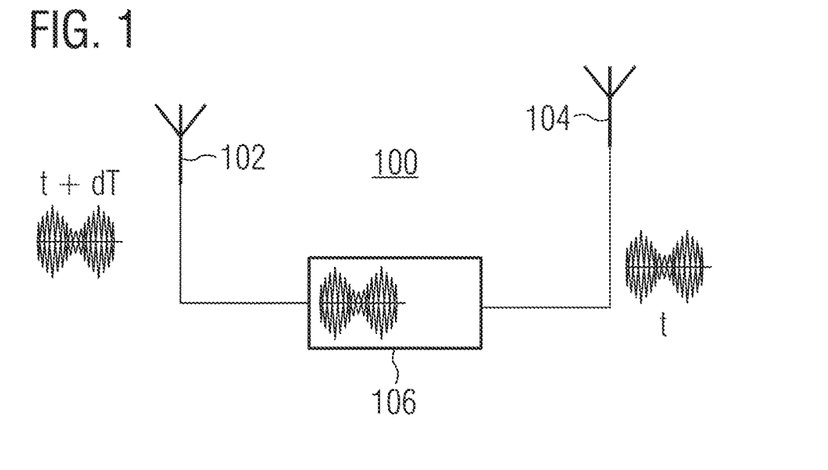
FIG. 1 schematically illustrates an embodiment of a transmit arrangement.

FIG. 1 schematically illustrates a transmit arrangement 100 for generating a signal pattern suitable for a localization. The same includes a first antenna 102 and a second antenna 104 as well as a transmit apparatus 106. The transmit apparatus 106 is configured to generate a known signal form and to transmit the known signal form by means of a transmit signal via the first antenna 120 and the second antenna 104.

According to some embodiments, a time difference dT between transmitting the known signal form via the first antenna 102 and via the second antenna 104 is greater than an oscillation period of the transmit signal.

According to some embodiments, the time difference merely results from the length of the supply cables used between the transmit apparatus 106 and the first antenna 102 and/or the second antenna 104. If, as indicated in FIG. 1, the known signal form is modulated onto a carrier signal of a higher frequency to acquire the transmit signal, according to some embodiments the time difference between transmitting the known signal form via the first antenna and the second antenna is greater than 25% of the inverse of the bandwidth of the transmit signal. I.e., the temporal distance between the known signal forms is greater than 25% of the time which corresponds to an oscillation period of the signal causing the modulation of a carrier signal. This may enable to uniquely identify the known signal forms transmitted by means of the first antenna and the second antenna despite the occurrence of multipath propagation if their temporal distance is large enough, for example, to prevent a confusion with a reflected signal. According to some embodiments, the temporal distance between the known signal forms may also be greater, for example greater than 30%, 50% 80% or 100% of the inverse of the bandwidth of the transmit signal.

Figure 2:
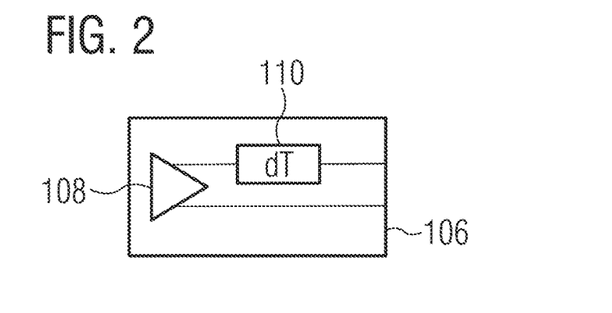
FIG. 2 shows an embodiment of a transmit apparatus which may be used in a transmit arrangement.

According to some embodiments, a transmit arrangement 106, as illustrated in FIG. 2, includes a transmitter 108 for generating the transmit signal and a delay device 110 configured to delay the transmit signal generated by transmitter 108 by a delay time dT.

According to some embodiments, the delay may be generated by means of cables of a suitable length. According to further embodiments, the delay device 110 may alternatively or additionally include analog or digital delays lines.

According to some further embodiments, the delay device 110 is configured to additionally temporally vary the delay time. I.e., the temporal distance in which the known signal form is transmitted via the first antenna 102 and via the second antenna 104 may temporally vary between subsequent transmit cycles. This imprints a further pattern component onto the signal pattern which may increase robustness and location accuracy.

Figure 3:
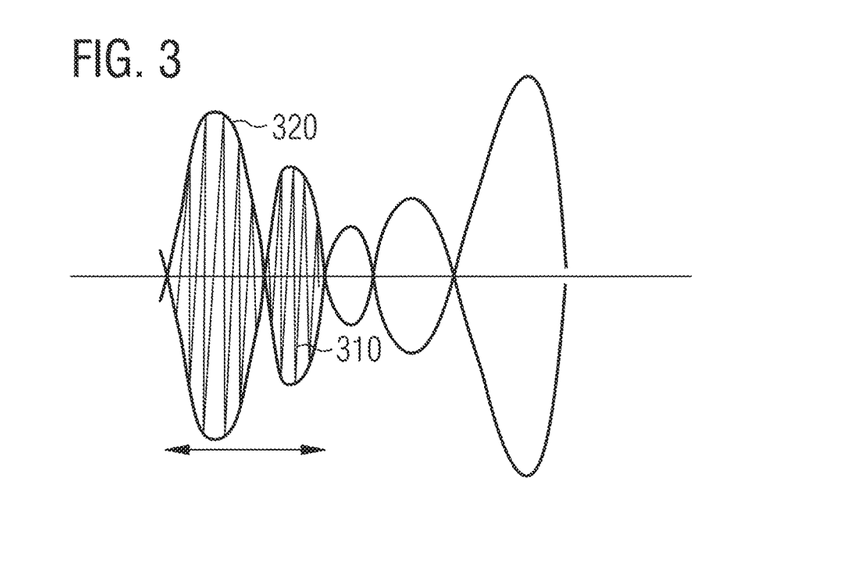
FIG. 3 schematically illustrates an example for a signal form transmitted by means of a carrier signal.

FIG. 3 exemplarily shows how a carrier signal 310 may be modulated with a known signal form 320 to acquire the transmit signal according to some embodiments of the invention. Here, the carrier signal may both be amplitude modulated or phase modulated and/or both a phase and also an amplitude modulation of the carrier signal 310 may be executed. By the modulation of the carrier signal 310 the envelope for the carrier signal 310 results as a known signal form 320, wherein the envelope 320 corresponds to the known signal form to be identified. The oscillation period of the transmit signal is given by the frequency of the carrier signal 310, wherein the time difference between transmitting the known signal form via the first antenna and the second antenna is given by a time difference between the initial receiving and the subsequent receiving of a signal series having the same envelope 320.

The time differences dT between the known signal forms are clearly greater than the oscillation periods of the carrier signal and in the dimension of an oscillation period 330 of the envelope 320. For the modulation of a carrier signal already existing systems may be used to provide embodiments of transmit arrangements, for example transmitters, which are compatible with one of the standards of the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (EUTRAN), Long Term Evolution (LTE) or LTE-Advanced (LTE-A). Also transmitters of a wireless communication system according to a different standard may be used, e.g. Worldwide Interoperability for Microwave Access (WIMAX) IEEE 802.16 or Wireless Local Area Network (WLAN) IEEE 802.11, more generally speaking any system based on Time Division Multiple Access (TDMA), Frequency Division Multiple Access (FDMA), Orthogonal Frequency Division Multiple Access (OFDMA), Code Division Multiple Access (CDMA), etc.

When using such systems, the modulation and the signal form may be varied within large boundaries to implement an advantageous configuration. For example, a known signal form may easily be generated by defining a known sequence of in-phase (I) and quadrature (Q) values in the baseband which determine the known signal form. Also the modulation speed, i.e. the bandwidth of the transmit signal may often be varied with these systems. This is important as the oscillation period 330 of the envelope 320 of the modulated signal determines at least the magnitude of the accuracy of the localization. From any received transmit signal of an antenna from the receive time of the known signal form a distance between transmit antenna and receive antenna may be estimated. An oscillation period 330 (T) here corresponds to a spatial extent of $x=T*c=c/f$ due to the finite speed of light c. Same ought to be within the magnitude of the required localization accuracy. By multiplying the bandwidths of the transmit signals supported by many of the above mentioned systems per se an adaptation of the system to the concrete requirements may be executed in a simple and cost-effective way. Here, the acquirable spatial resolution may be widely adapted, e.g. to relieve the radio channel in case of low requirements or increase the bandwidth of the signal for a high spatial resolution.

Although for reasons of simplicity in the above Figures only configurations having 2 antennas are illustrated, further embodiments may use a greater number of antennas arranged in a known spatial arrangement with respect to each other, for example 3, 4 or 5 antennas.

As a conclusion, an embodiment of a transmit arrangement (in the following also referred to as an infrastructure transmitter or transceiver) transmits a (possibly wideband) signal frame with a known signal modulation. Possible examples for this are pseudo-random sequences, e.g. Hadamard, M or Gold sequences defining the known signal form, wherein the embodiments are not limited to the mentioned examples. The modulated signals may additionally be formed with a filter pulse. Also a realization using known OFDM symbols is possible which again define known signal forms. The known signal form may also be defined by a preamble (and/or a midamble or a postamble) of a signal, however, which is otherwise used in an already existing telecommunications system for signal detection and channel estimation and may now additionally be used for localization.

These sequences are transmitted by the transmitter and/or transceiver in regular intervals or for example mixed into the radio band triggered by a received signal and put onto a signal splitter in an amplified way. There the signals are again put onto the transmit antennas via cables of a defined length and signal runtime. The distance between these regular transmit signals does not always have to be equal and may adaptively increase for a high localization rate or decrease for a sensible distribution of channel capacity.

The transmit antennas are distributed in an especially formed spatial pattern known to the receiver. Here, planar distributions are possible, e.g. attached to a wall, or also three-dimensional distributions may be advantageous as they contain further spatial information. One example for a three-dimensional distribution is the installation of four antennas in one corner: one directly in the corner and three in a respectively defined distance from the corner on one edge each. In contrast to a beam former, for example, the embodiments consciously include a temporal component.

In one variant an artificially introduced delay is introduced in front of some of the passive transmit sequences. This is for example done by     cable extensions,     an analog Delay Line (integrated delay line) or     a digital Delay Line including sampling and digital-to-analog conversion of the high-frequency signals.

An additional delay may enable a better separation of signals, for example when the artificial delay (and/or the differences of all artificial delays) reaches the magnitude of the reciprocal value of the signal bandwidth 1/B and/or becomes greater than the same. The delay may be eliminated and/or considered without problems by a direct limitation to the transmit pattern of the known signal form and/or the receive pattern to be expected. With a bandwidth of 1 MHz this would correspond to a runtime difference of 1 µs=300 m (section of open space)=200 m (cable section) with a corresponding attenuation. These cable sections for delays are strongly reduced if higher bandwidths are used, e.g.

20 MHz; T=50 ns=10 m (cable section) and/or
50 MHz; T=20 ns=4 m (cable section) and
80 MHz; T=12.5 ns=2.5 m (cable section).

In some embodiments, an initial calibration, i.e. a measurement of the different runtimes, is executed. These may also be determined quite easily from the dimensions of the delay line. In some embodiments, also the transmit carrier phase differences are measured which may possibly already change due to cable bends and a knowledge of the phase conditions enables a better pattern recognition.

In implementations with cable extensions power losses may be compensated by an active power amplifier, by attenuators at the other antennas or simply by considering the additional attenuation in the pattern calculation.

By inserting switches or switchable phase shifters/time constants at the individual transmit antennas the spatial pattern may be changed. So that several spatial patterns result with one set-up. With the help of different switching patterns and thus different spatial patterns, for example with respect to a position by means of averaging across different spatial patterns the estimate results are improved.

Figure 4:
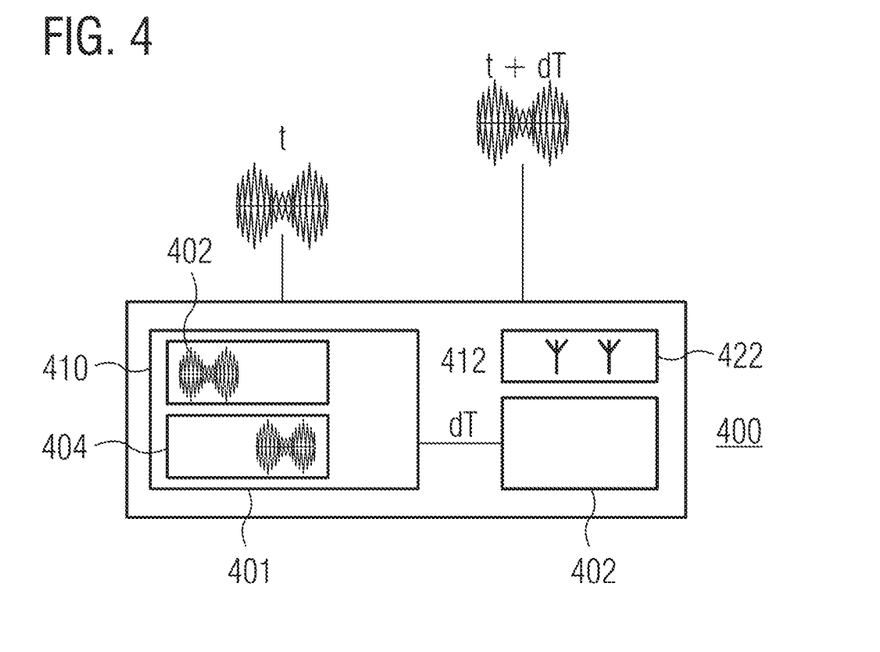
FIG. 4 schematically illustrates an example for a receive arrangement.

FIG. 4 schematically illustrates a receive arrangement 400 for executing a localization based on an observed signal pattern. The receive arrangement 400 includes a receive antenna arrangement 401 for receiving a transmit signal 402 transmitted by the first antenna 104 and a transmit signal 404 transmitted by the second antenna. The receive antenna arrangement 404 is illustrated merely schematically in FIG. 4. Same may consist of one antenna or of several antennas, wherein the antenna number may be selected to be randomly high.

According to some embodiments also an antenna array is used including individual antennas operated phase coherently to each other, so that by means of the antenna array, as will be explained later on, additionally also a direction estimation of the driving direction of the received signals may be executed. The receive arrangement 400 further comprises a signal analysis device 410. The signal analysis device 410 identifies the known signal form each in the transmit signal 402 received from the first antenna and the transmit signal 404 received from the second antenna and determines a time difference 412 (dT) between the identified signal form in the transmit signal received from the first antenna and from the second antenna. A localization device 420 is configured to determine information on a position of the receive antenna arrangement 401 using information on a position of the first and the second antenna and the time difference 412 (dT). For this purpose, the receive arrangement may optionally comprise a memory 422 in which the information on the position of the first and the second antenna is stored.

The information on the position may be stored in any way. For example, in the coordinate system specified for the respective application, the absolute coordinates of the antennas may be given. Alternatively, also a relative position between the first and second antennas may be stored as information on the position of the first and second antennas, which enables a localization relative to the antennas of the antenna arrangement. Of course, also information on several antennas of a transmit system may be stored to enable a localization in two dimensions or in three dimensions and to increase localization accuracy if several antennas are used for transmitting the known signal form.

Figure 5:
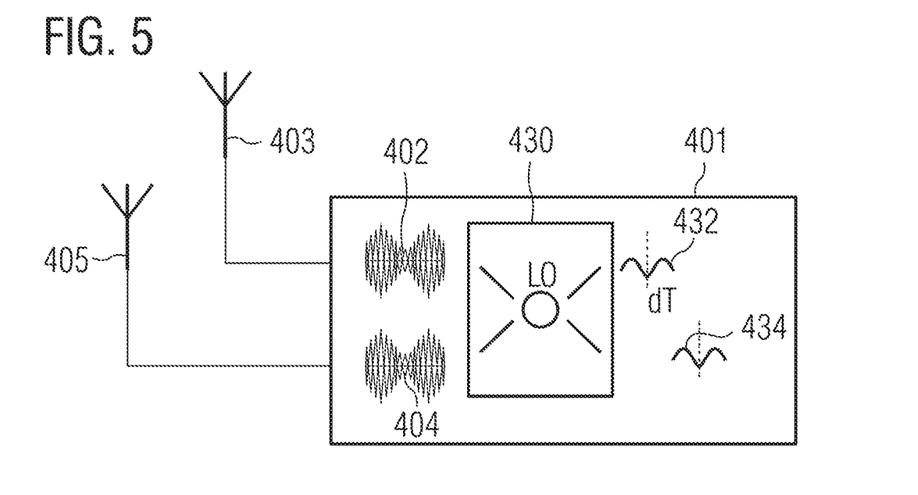
FIG. 5 shows an example for a signal analysis device which may be used in a receive arrangement according to FIG. 4.

FIG. 5 shows an example for a signal analysis device 401 which may be used if the known signal form is transferred by a modulation of a signal carrier and/or a carrier frequency.

In that case, the signal analysis device 401 comprises a demodulator 430 configured to demodulate the transmit signal 402 received from the first antenna and the transmit signal 404 received from the second antenna with a carrier signal (LO) to acquire a first baseband signal 432 and a second baseband signal 434. In the embodiment of a signal analysis device 401 illustrated in FIG. 5 the known signal form is subsequently determined in the baseband signals 432 and 434.

According to some embodiments, a receive arrangement further comprises a separate receiver for each antenna coupled to the same which may be operated synchronously with the remaining receivers of the receive arrangement. I.e., some embodiments further comprise a first receiver coupled to the first receive antenna 403 and at least a second receiver coupled to the second receive antenna 405 and synchronized with the first receiver. According to some embodiments, the localization device is 401 further configured to determine information on a relative orientation of the receive antenna arrangement with respect to the first antenna and the second antenna based on a relative phase between the carrier signal transmitted by the first antenna and the carrier signal transmitted by the second antenna. To facilitate this, some embodiments for example comprise an antenna array whose functioning is basically illustrated in FIG. 6. By means of the individual antenna elements 602a to 602e operated synchronously each the signals transmitted by the antennas are received. Based on a relative phase position of the carrier signals received by the individual antennas, as indicated below, the direction may be estimated from which the signal is received with respect to the antenna array.

Figure 6:
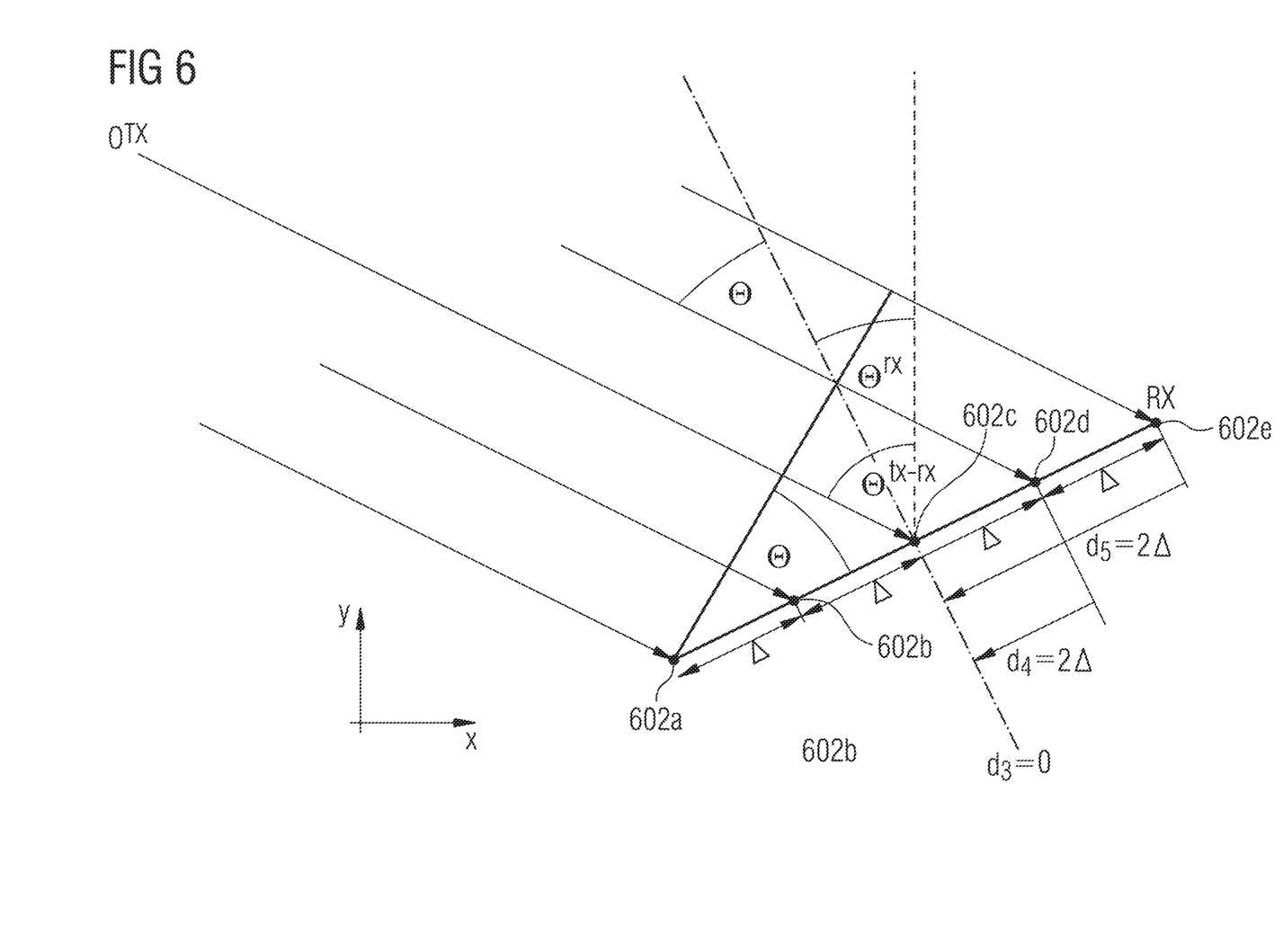
FIG. 6 illustrates an example for an antenna array.

By means of this additional optional direction estimation, some embodiments of the localization device may increase the localization accuracy by combining the information on the position of the receive antenna arrangement and the information on the relative orientation between the receive antenna arrangement and the first antenna as well as of the second antenna to both execute an estimation of the position and also the orientation of the receive antenna arrangement.

An antenna array (an antenna of diverse antenna elements in firmly defined relative positions to be operated phase-coherently) may e.g. be mounted on the industrial truck (forklift truck) or to its front or back side if the industrial truck is to be located. Antenna arrays may be used in different configurations. Possible designs for antenna arrays are, for example:

a linear antenna array of more than three elements,
a 2D antenna array having antennas in one plane,
antennas in one plane perpendicular to the main measuring direction (antenna e.g. facing forward),
antennas in one plane parallel to the main measuring direction (antenna e.g. having an all-round view),
a 3D arrangement of the antenna elements.

Additionally, further different polarizations may be considered.

In the following, a linear antenna according to the example of FIG. 6 is discussed for which already a 2D estimation problem results, that is the estimation of delay and angle. With a two-dimensional antenna array, already a three-dimensional parameter optimization would result, i.e. across runtime and azimuth and elevation proportion of the angle of incidence.

The received transmit signals may be brought into the digital baseband and be processed there by a multi-channel receiver with phase-coherent channels for each antenna element $602a, \ldots, 602e$ of the antenna array.

Alternatively, also a sequential reception at least at 2 coherent receive channels may be used. Here, the complete receive pattern of all antennas results by a combination of the patterns of individual patterns of two antennas each. The different antennas are coupled to the receive system by means of switching matrices. Subsequently, each antenna pair, one after the other, is switched onto the receive channels. After all pairs have been recorded once, a complete channel matrix across all antennas results by a combination of the individual receive data.

As already mentioned, the localization is executed by the detection of a spatial signal pattern, if applicable additionally considering a known temporal variation of the spatial signal pattern. In this respect, a direct spatial and, if applicable, temporal observation of the pattern is executed, wherein spatial indicates that runtimes (and thus distances) of signals and optionally the angle of incidence are evaluated. If additional variable signal delays at the antenna are used, additionally a temporal component is introduced. In case of relative localizations spatially may indicate that runtime differences and/or distance differences are considered. In the embodiments, reflections of the signal pattern generated at the location of a receive arrangement by the known signal forms basically look different or result in a different pattern alignment so that a multipath propagation may be detected and an erroneous localization caused by the same may be prevented.

The receive phase $\Phi$ results from the individual antenna distances for an assumed four transmit antennas for a position of the m receive antennas at the location $x_m^{rx}, z_m^{rx}, z_m^{rx}$ of the channel and/or receive phases:

$$\phi_{m1}^{rx} = \frac{\omega}{c_0}[(x_m^{rx}-x_1^{tx})^2 + (y_m^{rx}-y_1^{tx})^2 + (z_m^{rx}-z_1^{tx})^2]^{\frac{1}{2}} + \phi_1^{tx} + \phi_1^{kabel}$$

$$\phi_{m2}^{rx} = \frac{\omega}{c_0}[(x_m^{rx}-x_2^{tx})^2 + (y_m^{rx}-y_2^{tx})^2 + (z_m^{rx}-z_2^{tx})^2]^{\frac{1}{2}} + \phi_1^{tx} + \phi_2^{kabel}$$

$$\phi_{m3}^{rx} = \frac{\omega}{c_0}[(x_m^{rx}-x_3^{tx})^2 + (y_m^{rx}-y_3^{tx})^2 + (z_m^{rx}-z_3^{tx})^2]^{\frac{1}{2}} + \phi_1^{tx} + \phi_3^{kabel}$$

$$\phi_{m4}^{rx} = \frac{\omega}{c_0}[(x_m^{rx}-x_4^{tx})^2 + (y_m^{rx}-y_4^{tx})^2 + (z_m^{rx}-z_4^{tx})^2]^{\frac{1}{2}} + \phi_1^{tx} + \phi_4^{kabel}$$

For a localization, for the phases $\phi_{mi}^{rx}$ of the received known signal form those coordinates $x_m^{rx}, z_m^{rx}, z_m^{rx}$ are determined which solve the above equation system. Here, any optimization methods may be used. $\phi_i^{kabel}$ may be assumed to be 0 in case of an equal cable length. With a wideband transmission, in some embodiments, this phase would not only have to be related to the carrier frequency but the complete frequency range has to be considered. Considering different sub-frequencies which may be generated by FFT from the received signal, at any place in the space a possibly also ambiguous phase pattern may result. The incorporation of a received antenna array introduces an additional degree of freedom by the alignment and/or the relative orientation of transmit antennas and receive antenna arrangement, which is why embodiments may optionally also consider the alignment in the localization. The determination of the alignment may be more precise or be completed by gyroscope and compass information and possibly become more precise via radio measurement data of the signal patterns.

Alternatively or additionally also a consideration in the time domain may be executed. Same may be used for an initialization and/or a limitation of the search range of the delay $\tau_{mn}$ for the n-th transmit antenna and the m-th receive antenna to limit the time window in which it is tried to identify the known signal form in the received transmit signal, as the following applies:

This may reduce the required computational power.

$$r_{mn}^{rx}(t) = \beta_{mn} s_n^{tx}(t+\tau_{mn})e^{j\phi_{mn}^{rx}} + w_{mn}.$$

A special implementation of the localization of a receive arrangement at the location x is presented in the following paragraphs. This is considered based on the complex baseband signal y(t) which exists in the receive arrangement and includes portions from each transmit antenna after demodulating by means of a carrier signal and, if necessary, applying a pulse form filter.

A signal form s(t) transmitted by L antennas with individual delay $(\tau_l + \tau_{cable,l})$ may be described as the signal pattern y(t) in the presence of white noise w(t) at the receive side as follows:

$$y(t) = h(t)*s(t) + w(t) = \sum_{l=0}^{L-1} h_l \delta(t-\tau_l-\tau_{cable,l})*s(t) + w(t).$$

To identify the transmitted signal form in the received signal pattern y(t), the same is correlated with the transmitted signal form s(t) which corresponds to a convolution with the mirrored complex conjugated signal form s*(−t), as it is done in (sequence) matched filters. After the matched filter the following signal is obtained $\bar{y}(t, T_1)$:

$$\bar{y}(t, T_1) = s^*(T_1 - t) * h(t) * s(t) + s^*(T_1 - t) * w(t)$$
$$= (s^*(-t) * \delta(t - T_1)) * h(t) * s(t) + \bar{w}(t)$$
$$= h(t - T_1) * (s^*(-t) * s(t)) + \bar{w}(t)$$
$$= h(t - T_1) * r_{ss}(t) + \bar{w}(t).$$

By the temporal course of the signal $\bar{y}(t, T_1)$ the known signal form s(t) is each identified in the transmit signal in the received signal pattern received by the first antenna and the second antenna, for example by a local maximum in $\bar{y}(t, T_1)$.

Depending on the location x of the receive arrangement the temporal course of the signal $\bar{y}(t, T_1)$ varies, which may also be referred to as the channel pattern of the propagation channel h(t, x) between the transmit arrangement and the actual position of the receive arrangement. This is correlated with the signal $\bar{y}(t, T_1)$ for different assumed locations x, wherein preferably a temporal range is considered given by the time instants of identifying the known signal form in the transmit signal received from the first antenna and the second antenna (in particular, includes both time instants and is consequently longer than the time difference between the identified signal form and the transmit signal received from the first antenna and the second antenna):

$$\bar{y}(t, T_1, x) = \hat{h}^*(-t, x) * \bar{y}(t, T_1)$$
$$= \hat{h}^*(-t, x) * h(t - T_1) * r_{ss}(t) + \hat{h}^*(t, x) * \bar{w}(t)$$
$$= \hat{r}_{hh}(-t, T_1) * r_{ss}(t) + \bar{w}(t, x).$$

As a position of the receive antenna arrangement $\hat{x}$ the position x is determined for which the function $\overline{y}(t, T_1, x)$ becomes maximal:

$$\hat{x} = \underset{x}{\mathrm{argmax}}\, \overline{y}(t, T_1, x).$$

By correlating the signals, in position determination, apart from the time difference also a phase difference between the identified signal form in the transmit signal received from the first antenna and from the second antenna is wholly considered. The same applies for the amplitude difference which is also reflected in h(t, x).

For restricting the search space, in some embodiments the search space may be restricted based on a priori knowledge or side information gained in any way for the possible positions x.

Methods of position detection and/or the identification of the known signal form may be random and for example cause a maximizing of signal metrics, like MUSIC (Schmidt, R. O, "Multiple Emitter Location and Signal Parameter Estimation," IEEE Trans. Antennas Propagation, Vol. AP-34 (March 1986), pp. 276-280.), JADE-MUSIC, ML, or similar to classical beam formers or methods according to ESPRIT (Roy, Richard, and Thomas Kailath. "ESPRIT-estimation of signal parameters via rotational invariance techniques." Acoustics, Speech and Signal Processing, IEEE Transactions on 37.7 (1989): 984-995) or SI-JADE function (van der Veen, A-J., Michaela C. Vanderveen, and A. Paulraj. "SI-JADE: an algorithm for joint angle and delay estimation using shift-invariance properties." Signal Processing Advances in Wireless Communications, First IEEE Signal Processing Workshop on. IEEE, 1997). If in optimization additionally orientation is used, for a localization in the two-dimensional space (in one plane) an optimization in the three-dimensional space of the parameters $(x^{rx}, y^{rx}, \theta^{rx})$ has to be executed. The same becomes four-dimensional $(x^{rx}, y^{rx}, z^{rx}, \theta^{rx})$ in the three-dimensional space or even five-dimensional $(x^{rx}, y^{rx}, z^{rx}, \theta^{rx,azim}, \theta^{rx,elev})$, if a two-dimensional constellation of the receiving antenna array is planned for measuring azimuth and elevation. Optimization of a cost function may in part take place successively and iteratively.

The alignment of the measuring antenna array and/or the receive antenna arrangement with respect to a transmit antenna is introduced into the signal phase of the envelope and the carrier signal in the electromagnetic far field approximately (for a spotlight) via a spatial offset with respect to the phase center of the antenna array. The following consideration for one individual transmit antenna TX mainly refers to the phase differences. The angle relationships plotted in FIG. 6 result as follows:

The alignment of the perpendicular of the antenna array where the transmitter is located from the perspective of the receiver results from $$\Theta^{TX-RX} = \mathrm{atan}\left(\frac{x^{TX} - x^{RX}}{y^{TX} - y^{RX}}\right)$$

in the selected coordinate system. For the relative alignment the following applies:

$$\Theta = \Theta(x^{TX}, y^{TX}, x^{RX}, y^{RX}) = \Theta^{TX-RX}(x^{TX}, y^{TX}, x^{RX}, y^{RX}) - \Theta^{RX}.$$

With a distance $d_m = [(x^{TX} - x_m^{TX})^2 + (y^{TX} - y_m^{TX})^2]^{1/2}$ (here in the two-dimensional plane) of the individual antenna elements to the phase center $(x_m^{TX}, y_m^{TX})$ of the antenna array the additional phase change results.

$$\Phi_m = \frac{\omega d_m}{c_0} \cos(\Theta(x^{TX}, y^{TX}, x^{RX}, y^{RX})).$$

Alternatively, of course the coordinates $(x^{RX}, y^{RX})$ of the individual antenna elements may be considered directly for the determination of the phase change.

Taking the position, when using an antenna array, not only a spatial and temporal signal pattern (a steering vector) may be considered in localization, but a steering matrix may be used in the optimization and thus the localization as the relative positions of the transmit antennas are known.

Based on the previous basic considerations, a plurality of concrete implementations is enabled which are based on the same basic idea.

In one possible implementation, a correlation of the transmit signal and/or the known signal form in the multi-antenna receiver may be used to identify the known signal form (combined angle/runtime estimator). For determining the angle dimension a situation would result which is similar to that of a (Bartlett) beam former, wherein the information in the time dimension corresponds to that of an adapted correlator.

A further realization may orient itself at the JADE algorithm (Vanderveen, Michaela C., Constantinos B. Papadias, and Arogyaswami Paulraj. "Joint angle and delay estimation (JADE) for multipath signals arriving at an antenna array." Communications Letters, IEEE 1.1 (1997): 12-14).

From an assumed position first of all an orientation (angle) and a delay (runtime) would result. From this temporal-angular steering a signal spectrum may be determined. From this, position probabilities result (and/or a set of the C most probable positions) for all transmitters which may be used as an input for Kalman and/or particle filters with a movement model for a smoothed position finding.

A modified implementation may be based also on a visual signal processing (Weiss, Anthony J., and Alon Amar. "Direct position determination of multiple radio signals." EURASIP Journal on Applied Signal Processing 2005.1 (2005): 37-49.), wherein by an overlaying of the JADE-MUSIC spectres of different transmit-"tripods" (i.e.) a directly improved position information is transferred to the position calculator (Kalman and/or particle filter).

In any implementations search spaces of a priori information like the last position may be restricted to make the system more robust and to reduce computational effort.

In all implementations additional information from an inertial sensorics, in particular odometry data of the vehicle may be used to support the position calculation and/or localization.

Although for reasons of clarity only a transmit arrangement is described, in further implementations several transmit arrangements may be distributed in space. The same may, for example, be code, frequency or time division multiplexed (CDMA, FDMA, TDMA) or a combination of two or all of the same to enable a differentiation. Further possibilities of differentiation are different polarizations (horizontal/vertical and/or circular RHCP and LHCP), or the transmit arrangements transmit opportunistically (possibly with CSMA) and transmit IDs.

In implementations in which a receive antenna arrangement only comprises one receive antenna the localizations are based on different runtimes of the known signal forms. Localization methods here are based on the runtime difference based on the different transmit positions.

Further embodiments may use several antenna arrays. In some embodiments, the transmit modulation may be narrow-banded. In some embodiments, in the transmit arrangement a frequency hopping may be applied. In further transmit arrangements, the modulation in the transmit arrangement may be ultra-broadband. In some transmit arrangements, the transmit modulation may also be unknown, operation may e.g. be based on payload data.

Figure 7:
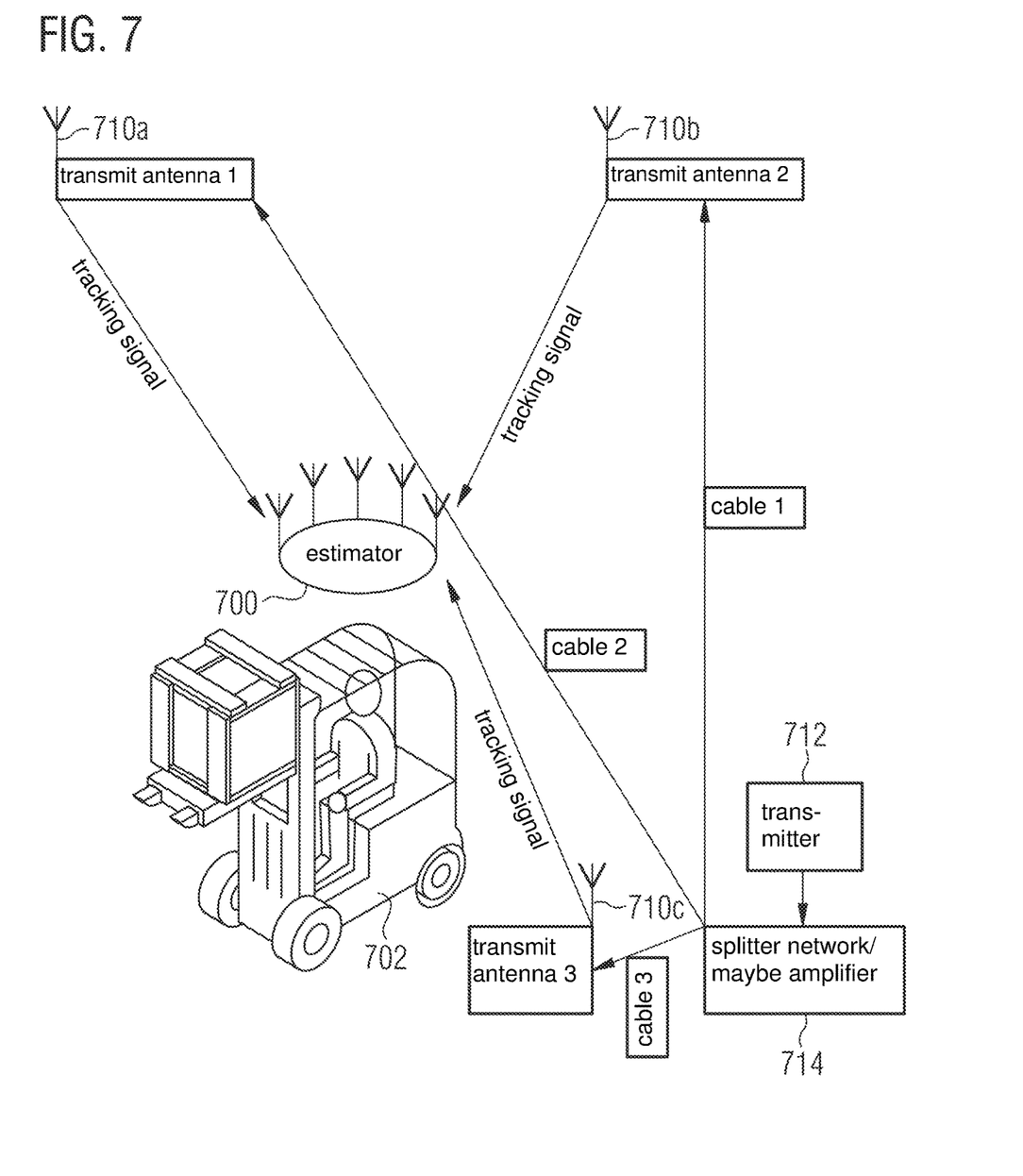
FIG. 7 illustrates an example for an application of a transmit arrangement and a receive arrangement for the location of industrial trucks.

FIG. 7 illustrates an application of a receive arrangement 700 for the localization of an industrial truck 702, in particular a forklift truck. The receive arrangement 700 is attached to the industrial truck.

In the example shown in FIG. 7, the transmit arrangement consists of the first antenna 710a, a second antenna 710b and a third antenna 710c. In the architecture of the transmit arrangement illustrated in FIG. 7, the time difference between transmitting the known signal form via the respective antennas 710a to 710c is generated by the used cables of different lengths, i.e. one single transmitter 712 is used to generate the transmit signal and distribute the same via a passive splitter network 714 to the individual antennas 710a to 710c. If necessary, a compensation of the power losses may be done in the cables of different lengths by an additional amplifier.

Figure 8:
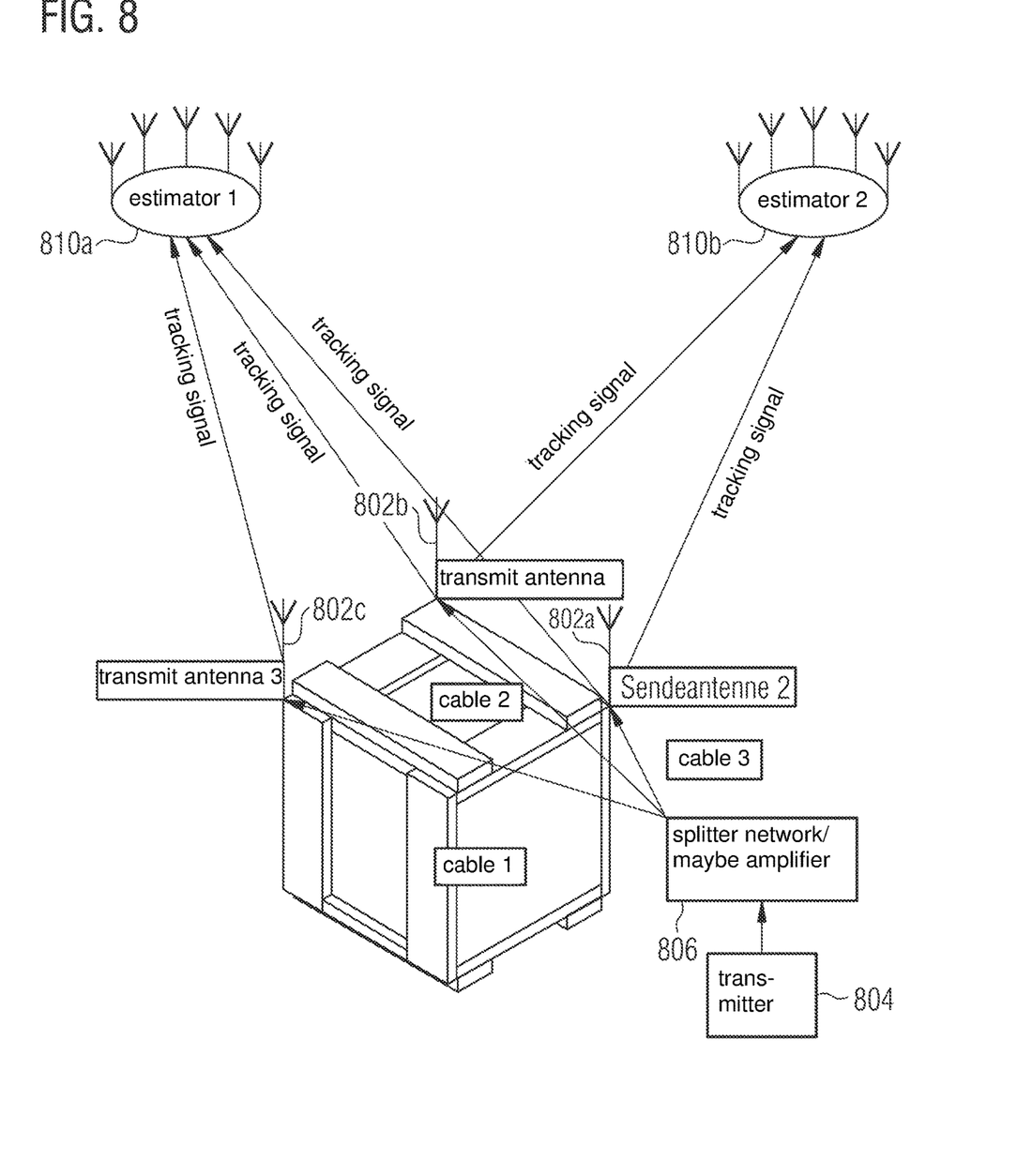
FIG. 8 illustrates an example for a direct localization of an object.

FIG. 8 illustrates an application of a localization system in which the transmit arrangement is mounted to the object to be localized, whereas at least two receive arrangements 810a and 810b are distributed within the volume in which the items are to be localized and/or located. The transmit arrangement again consists of three transmit antennas 802a to 802c arranged in a known spatial orientation relative to each other at the object. Just like in the embodiment illustrated in FIG. 7, the transmit signal is generated by means of one single transmitter 804 and distributed to the individual antennas via a splitter network 806.

Although in FIG. 8 two receive arrangements 810a and 810b are illustrated forming the infrastructure in the monitored space, also in this constellation further embodiments may only use one receive arrangement. Basically there is the possibility when using one single receive arrangement in connection with one single transmit arrangement to provide one localization system which enables the localization and/or location of items within a monitoring volume with high accuracy and comparatively low usage of resources.

Figure 9:
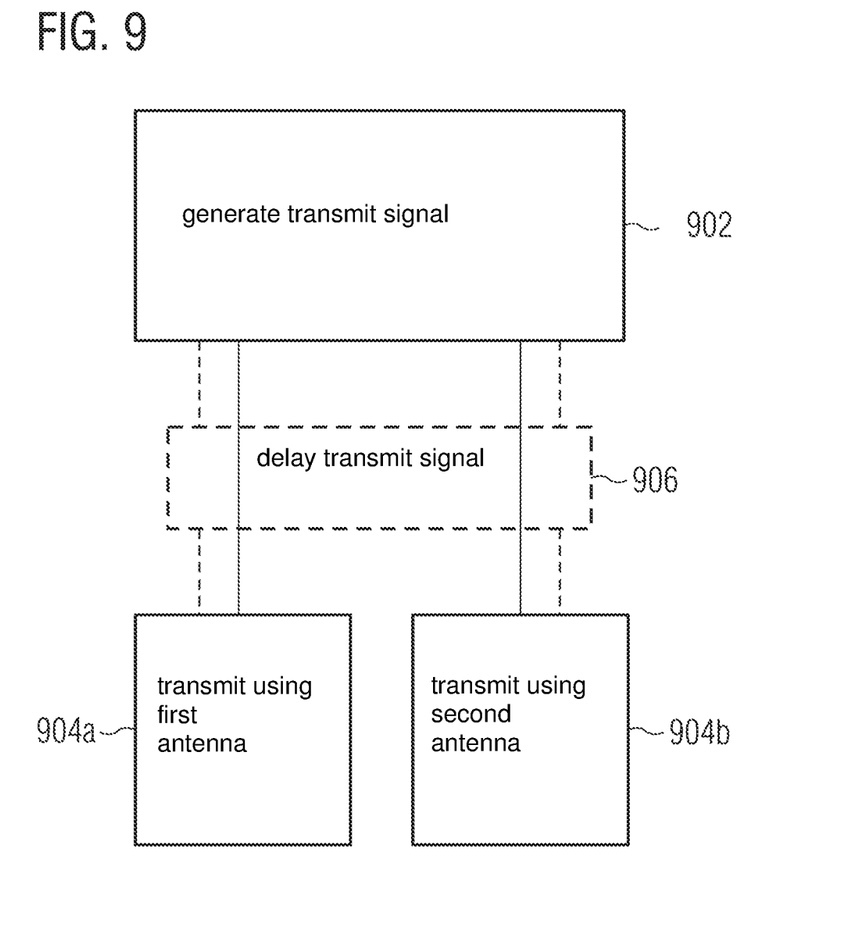
FIG. 9 illustrates a flowchart of an example of a method for generating a signal pattern suitable for a localization.

FIG. 9 schematically illustrates one embodiment of a method for generating a signal pattern suitable for a localization. The method includes generating 902 a known signal form 902. The method further includes transmitting of the known signal form via a first antenna 904a and transmitting of the known signal form via a second antenna 904b by means of a transmit signal, wherein the second antenna is spaced apart from the first antenna.

Optionally, the method may further include delaying 906 the transmit signal 906 so that a time difference between transmitting the transmit signal via the first antenna and via the second antenna corresponds to a predetermined criterion.

Figure 10:
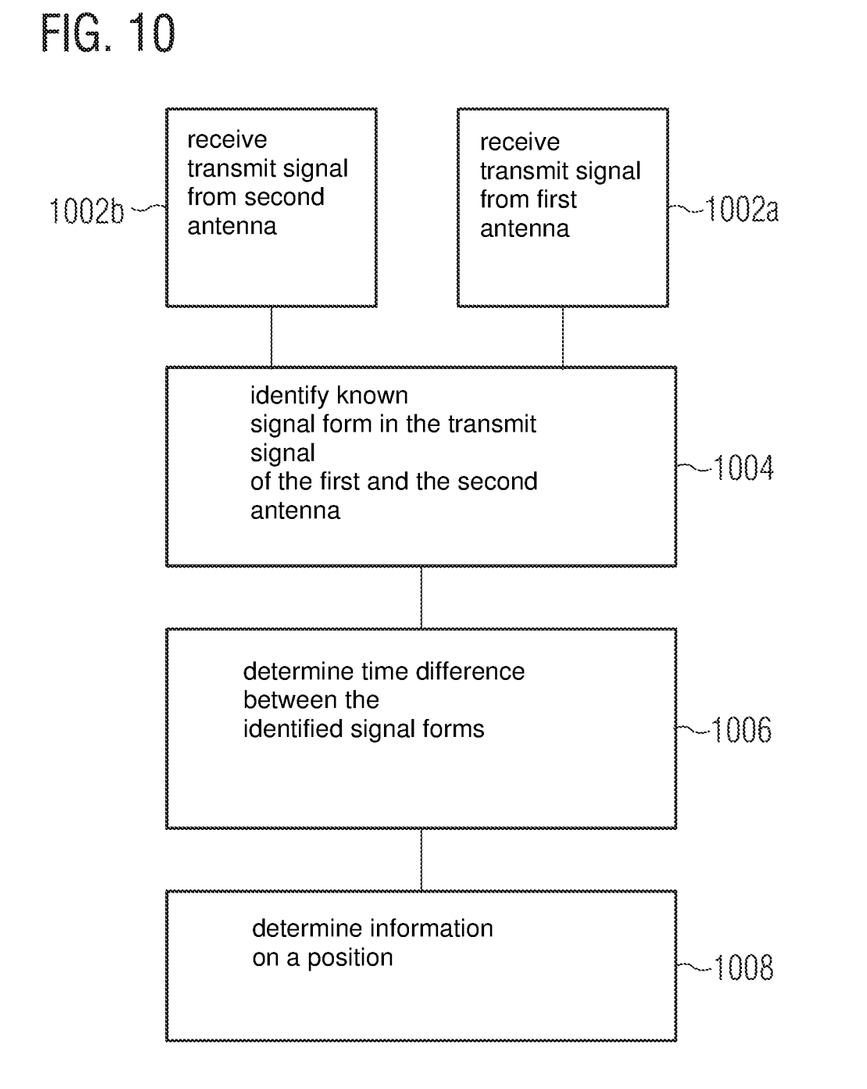
FIG. 10 illustrates a flowchart of an example of a method for executing a localization based on an observed signal pattern.

In the form of a flow chart FIG. 10 schematically illustrates an embodiment of a method for performing localization based on an observed signal pattern. The method comprises receiving a transmit signal 1002a transmitted by the first antenna and a transmit signal 1002b transmitted by the second antenna.

The method further comprises identifying 1004 a known signal form each in the transmit signal received from the first and second antennas and determine a time difference (dT) between the identified signal form in the transmit signal 1006 received from the first antenna and the one from the second antenna. Determining information on a position 1008 is done using the information on a position of the first and the second antenna and the determined time difference dT.

The features disclosed in the above description, the enclosed claims and the enclosed Figures may both individually and in any combination be of importance and implemented for realizing an embodiment in their various forms.

Although some aspects have been described in connection with an apparatus, it is clear that these aspects also illustrate a description of the corresponding method, where a block or a device of an apparatus is to be understood as a corresponding method step or a feature of a method step. Analogously, aspects described in the context of or as a method step also represent a description of a corresponding block or detail or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, a hard disc or another magnetic or optical memory having electronically readable control signals stored thereon, which cooperate or are capable of cooperating with a programmable hardware component such that the respective method is performed.

A programmable hardware component may be formed by a processor, a Central Processing Unit (CPU), a Graphics Processing Unit (GPU), a computer, a computer system, an Application-Specific Integrated Circuit (ASIC), an Integrated Circuit (IC), a System on Chip (SOC), a programmable logics element or a Field Programmable Gate Array (FPGA) comprising a microprocessor.

Therefore, the digital storage medium may be machine or computer readable. Some embodiments also include a data carrier comprising electronically readable control signals which are capable of cooperating with a programmable computer system or a programmable hardware component such that one of the methods described herein is performed. One embodiment is thus a data carrier (or a digital storage medium or a computer readable medium) on which the program for executing of the method described herein is stored.

Generally speaking, embodiments of the present invention may be implemented as a program, firmware, a computer program or a computer program product having a program code or as data, wherein the program code or the data is effective to execute one of the methods when the program is executed on a processor, or a programmable hardware component. The program code or the data may, for example, also be stored on a machine-readable carrier or data carrier. The program code or the data may among others be present as a source code, machine code or byte code or any other intermediate code.

A further embodiment is a data stream, a signal sequence or a sequence of signals which may represent the program for executing one of the methods described herein. The data stream, the signal sequence or the sequence of signals may for example be configured so as to be transferred via a data communication connection, for example via the internet or another network. Embodiments thus also are signal sequences representing data suitable for being transferred via a network or a data communication connection, the data representing the program.

A program according to one embodiment may implement one of the methods during its execution for example by reading out memory locations or writing one or several data into the same, whereby possibly switching processes or other processes in transistor structures, amplifier structures or in other electrical, optical, magnetical or other members operating according to another functional principle are caused. Accordingly, by reading out a memory location, data, values, sensor values or other information is determined, detected or measured by a program. By reading out one or several memory locations, a program may detect, determine or measure magnitudes, values, measured quantities and other information and, by writing into one or several memory locations, cause, trigger or execute an action and control other devices, machines and components.

The above described embodiments are merely an illustration of the principles of the present invention. It is understood that modifications and variations of the arrangements and the details described herein will be apparent to others skilled in the art. It is the intent, therefore, that this invention is limited only by the scope of the impending patent claims and not by the specific details presented by way of description and explanation of the embodiments herein.

The invention claimed is:

1. A transmit arrangement for generating a signal pattern suitable for a localization, comprising:
    a first antenna;
    at least one second antenna spatially separated from the first antenna,
    a transmit apparatus configured to:
        generate a known signal form, wherein the known signal form is a sequence of in-phase and quadrature values in the baseband known to an at least one receiver;
        modulate a carrier signal with the known signal form; and
        transmit the transmit signal via the first and second antennas;
    a transmitter for generating the transmit signal simultaneously connected to the first antenna and the second antenna; and
    at least one delay device arranged between the transmitter and the first antenna or the second antenna and configured to delay transmit signal generated by the transmitter by a delay time.

2. The transmit arrangement according to claim 1, wherein a time difference between transmitting the known signal form via the first antenna and the second antenna is greater than an oscillation period of the transmit signal.

3. The transmit arrangement according to claim 1, wherein a time difference between transmitting the known signal form via the first antenna the second antenna is greater than 25% of the inverse of a bandwidth of the transmit signal.

4. The transmit arrangement according to claim 1, wherein a first time difference between transmitting the known signal form via the first antenna and the second antenna in an initial transmission is different from a second time difference between transmitting the known signal form via the first antenna and the second antenna in a second transmission.

5. The transmit arrangement according to claim 1 wherein the delay device comprises a cable section corresponding to a delay.

6. The transmit arrangement according to claim 1 wherein the delay device comprises an analog or digital delay line.

7. The transmit arrangement according claim 1, wherein the delay device is configured to vary the delay time.

8. The transmit arrangement according to claim 1, wherein the transmit arrangement is configured to modulate a carrier signal with the known signal form to receive the transmit signal.

9. A receive arrangement for executing a localization based on an observed signal pattern, comprising:
    a receive antenna arrangement configured to receive for receiving a transmit signal transmitted by the first antenna and a transmit signal simultaneously transmitted by the second antenna;
    a signal analysis device configured to identify a known signal form each in the transmit signal received from the first antenna and the second antenna, wherein the known signal form is a sequence of in-phase and quadrature values in the baseband known to an at least one transmitter, and determine a time difference and a phase difference between the identified signal form in the transmit signal received from the first antenna and the one from the second antenna; and
    a localization device configured to determine information on a position of the receive antenna arrangement using information on a position of the first antenna and the second antenna, the time difference and the phase difference.

10. The receive arrangement according to claim 9, wherein the signal analysis device comprises a demodulator configured to demodulate the transmit signal received from the first antenna and the transmit signal received from the second antenna with a carrier signal to receive a first baseband signal and a second baseband signal, wherein the known signal form is identified in the first baseband signal and in the second baseband signal.

11. The receive arrangement according to claim 10, further comprising:
    at least one first receive antenna for receiving the transmit signal transmitted by means of the first antenna and a second receive antenna for receiving the transmit signal transmitted by means of the second antenna in the receive antenna arrangement;
    wherein
    the localization device is further configured to determine information on a relative orientation of the receive antenna arrangement with respect to the first antenna and the second antenna based on a relative phase between the carrier signal transmitted by means of the first antenna and the carrier signal transmitted by means of the second antenna.

12. The receive arrangement according to claim 11, further comprising a first receiver coupled to the first receive antenna and at least a second receiver coupled to the second receive antenna synchronized with the first receiver.

13. The receive arrangement according to claim 11, wherein the localization device is configured to combine the information on the position of the receive antenna arrangement and the information on the relative orientation to determine a position and orientation of the receive antenna arrangement.

14. The receive arrangement according to claim 9 wherein the receive antenna arrangement comprises an antenna array.

15. An industrial truck comprising a receive arrangement the receive arrangement comprising:
- a receive antenna arrangement configured to receive a transmit signal transmitted by a first antenna and a transmit signal simultaneously transmitted be a second antenna,
- a signal analysis device configured to identify a known signal form each in the transmit signal received from the first antenna and the second antenna, wherein the known signal form is a sequence of in-phase and quadrature values in the baseband known to an at least one transmitter, and determine a time difference and a phase difference between the identified signal form in the transmit signal received from the first antenna and the one from the second antenna, and
- a localization device configured to determine information on a position of the receive antenna arrangement using information on a position of the first antenna and the second antenna, the time difference and the phase difference.

16. A method of generating a signal pattern suitable for a localization,
comprising:
- generating a known signal form,
- transmitting the known signal form via a first antenna by means of a transmit signal antennas, wherein the known signal form is a sequence of in-phase and quadrature values in the baseband known to an at least one receiver; and
- transmitting the known signal form via a second antenna, spatially separated from the first antenna by means of the transmit signal;
- delaying the transmit signal for the first or the second antenna to receive a delayed transmit signal, wherein the transmit signal and the delayed transmit signal are transmitted simultaneously.

17. The method according to claim 16, further comprising:
- delaying the transmit signal for the first or the second antenna such that a time difference between transmitting the transmit signal via the first antenna and the second antenna is greater than an oscillation period of the transmit signal.

18. A method of executing a localization based on an observed signal pattern, comprising:
- receiving a transmit signal transmitted by the first antenna and a transmit signal simultaneously transmitted by the second antenna;
- identifying a known signal form each in the transmit signal received from the first and the second antenna, wherein the known signal form is a sequence of in-phase and quadrature values in the baseband known to an at least one transmitter;
- determining a time difference between the identified signal form in the transmit signal received from the first antenna and from the second antenna; and
- determining information on a position using information on a position of the first and the second antenna.

19. The method according to claim 18, further comprising:
- demodulating the transmit signal received from the first antenna and the transmit signal received from the second antenna with a carrier signal to acquire a first baseband signal and a second baseband signal;
- identifying the known signal form in the first baseband signal and in the second baseband signal.

* * * * *